United States Patent

[11] 3,629,691

[72] Inventor Carl Franklin Wheatley, Jr.
Somerset, N.J.
[21] Appl. No. 54,536
[22] Filed July 13, 1970
[45] Patented Dec. 21, 1971
[73] Assignee RCA Corporation

[54] CURRENT SOURCE
15 Claims, 1 Drawing Fig.

[52] U.S. Cl. .......... 323/1, 307/297, 323/4
[51] Int. Cl. .......... G05f 3/08
[50] Field of Search .......... 307/297, 296; 323/1, 4

[56] References Cited

UNITED STATES PATENTS

| | | | |
|---|---|---|---|
| 3,508,081 | 4/1970 | Matsuda .......... | 307/297 |
| 3,510,695 | 5/1970 | Lauper .......... | 307/296 |

OTHER REFERENCES

Keller & Olderdissen, " Current Source Generator," IBM Technical Disclosure Bulletin, Vol. 12, No. 11, April 1970, page 2031

*Primary Examiner*—A. D. Pellinen
*Attorney*—E. M. Whitacre

ABSTRACT: A semiconductor current source adapted for integrated circuit fabrication. A first transistor and a second diode-connected transistor have their base-emitter circuits coupled in parallel. A current-determining resistor is connected between the emitters of the transistors. The effective base-emitter junction area of the diode-connected transistor is greater than that of the first transistor. The collectors of the first and second transistors are coupled to feedback circuitry which tends to maintain their collector currents substantially equal despite the difference in device areas. A difference in base-emitter voltage of the two transistors appears across the emitter resistor and determines the operating current level.

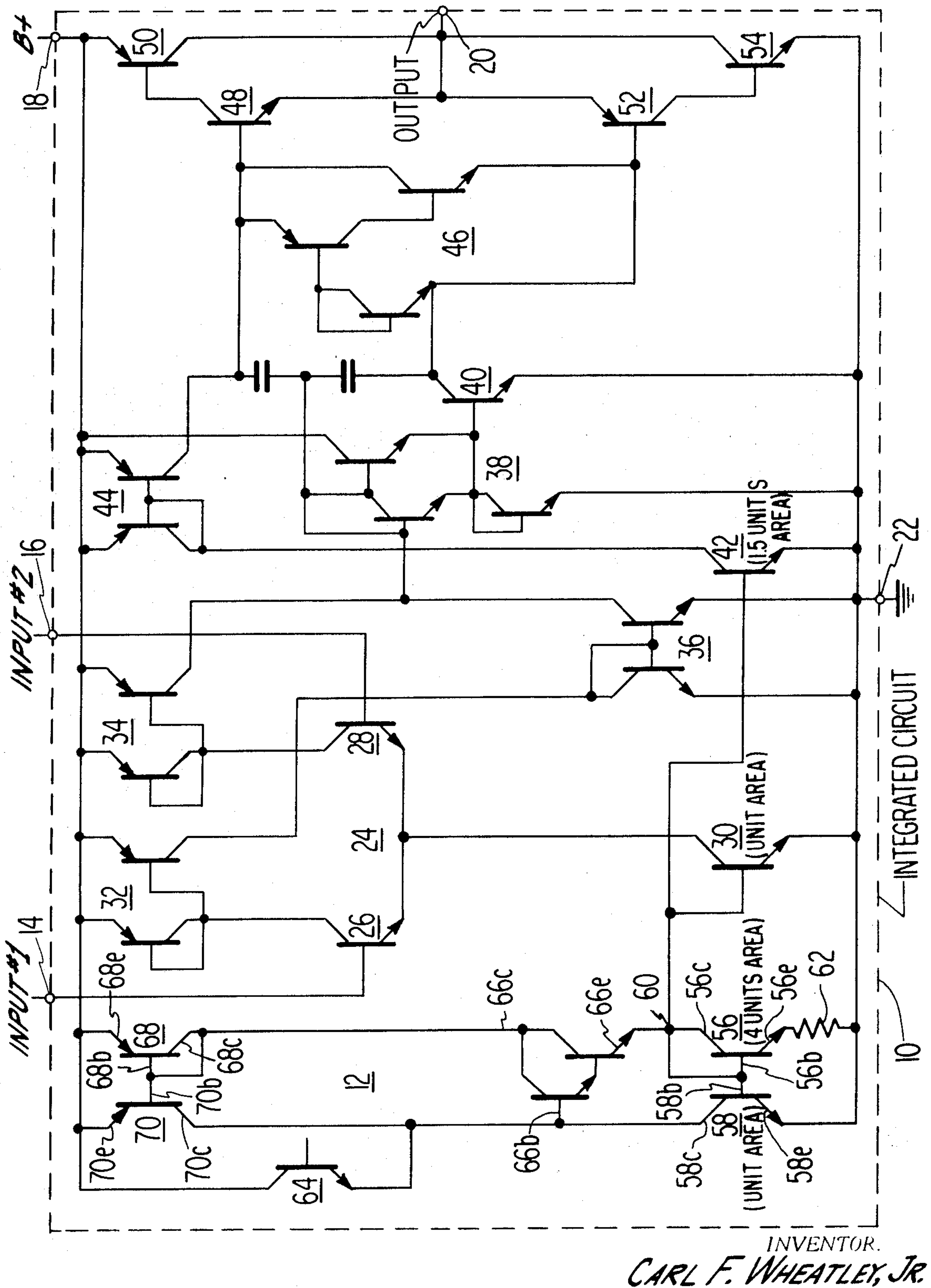
INVENTOR.
CARL F. WHEATLEY, JR.
BY
Kenneth R. Schaefer
Attorney

CURRENT SOURCE

This invention relates to current sources and, in particular, to semiconductor current sources adapted for providing electrical currents over a wide range of values, for example, from the order of milliamperes to the order of microamperes.

Numerous techniques are available for providing low-level current sources which are employed, for example, for biasing transistors or for supplying low-level operating currents to small signal amplifiers. Generally, such techniques require the use of relatively large value resistors in order to obtain the desired low-current levels from conventional voltage supplies. In the integrated circuit environment, because of space and power dissipation limitations, it is undesirable to include large value resistors on the integrated circuit chip. At the same time, in that very environment, it is frequently desirable to employ low-current level operation or biasing of transistors. One approach used in integrated circuits is to supply the desired current from an external voltage supply via a relatively large external resistor. However, this requires use of one of the few terminals of the chip, and furthermore the supplied current will vary if the external voltage supply varies.

A different approach commonly employed in integrated circuits involves the combination of a current source transistor having a collector output, an unbypassed emitter resistor coupled to a reference point diode-connected transistor coupled between the base of the current source transistor and the reference point. In such configuration, the transistor collector output current varies as a function of the current supplied to the diode-connected transistor. For example, where the entire current supply is internal to the chip, the collector output current varies as a function of the associated voltage supply provided on the chip. Generally, this approach also suffers from the disadvantage that a relatively large dropping resistor (or other voltage-dropping component) is required in the input current supply.

In accordance with the present invention, a low-level current supply is provided which is substantially independent of supply voltage variations. Furthermore, the low-level current (e.g., of the order of microamperes) may be derived from a voltage supply of a magnitude suitable for use on an integrated circuit chip (e.g., of the order of 10 volts) utilizing circuit means which include a single resistor suitable for integrated circuit fabrication (e.g. the order of 100 ohms). The desired current level thus may be obtained entirely by circuit means included on an integrated circuit chip with a relatively few space- and power-consuming components and without the need for extra terminals on the chip.

A current source constructed in accordance with the present invention comprises first and second transistors each having base, emitter and collector electrodes. A single resistor is coupled from the emitter electrode of one of the two transistors to a reference point while the emitter of the other transistor is coupled to the reference point by a substantially lower impedance (preferably approaching zero). Means are also provided for directly coupling the base electrodes of the transistors to a common input point. The collector of the first transistor is also directly coupled to the input point. The conduction characteristics of the transistors are proportionally related and, in the illustrated embodiment, the first transistor has a greater effective base-emitter area than that of the second transistor. An input current is supplied to the common input point and means are also coupled to the collectors of the first and second transistors for maintaining the collector currents of such transistors, under steady-state conditions, in a predetermined ratio different from their effective area ratio.

The novel features that are considered characteristic of this invention are set forth in the appended claims. The invention itself, however, both as to its organization and method of operation, as well as additional objects will best be understood from the following description when read in connection with the accompanying drawing.

The drawing illustrates, in schematic circuit diagram form, an amplifier suitable for construction on a single integrated circuit chip which employs a current supply arrangement in accordance with the present invention.

Referring to the drawing, a low-power operational transconductance amplifier suitable for construction in monolithic integrated circuit form is illustrated. All components enclosed within the dashed-line rectangle are suitable for fabrication on a single integrated circuit chip 10.

A substantial portion of the amplifier arrangement of chip 10 has been described in detail in my previously filed U.S. Pat. application Ser. No. 869,708 filed Oct. 27, 1969 entitled, "-Bias Networks for Class B Operation of an Amplifier," which is assigned to the same assignee as the present invention. The amplifier will therefore be described in this application only insofar as it relates to the current source configuration indicated generally by the reference numeral 12.

The integrated circuit chip 10 is provided with terminals 14, 16, 18, 20 and 22 which serve, respectively, to couple the circuitry on chip 10 to a first input signal source, a second input signal source, a source of direct operating voltage (B+), an output utilization load and a reference (ground) voltage terminal.

Input signal terminals 14 and 16 are coupled to a differential amplifier arrangement 24 comprising a pair of emitter-coupled transistors 26 and 28. A transistor current supply 30 supplies operating current to transistors 26 and 28. Active load circuits 32 and 34 are associated, respectively, with transistors 26 and 28 and are coupled from the collectors of transistors 26 and 28 to the operating voltage (B+) terminal 18. Each of load circuits 32 and 34 comprises a transistor and a diode-connected transistor, the latter being coupled across the base-emitter junction of the associated transistor. The transistors in the load circuits 32 and 34 are of opposite-type conductivity (PNB) with respect to the NPN-amplifier and current supply transistors 26, 28, 30. Outputs from the collectors of the transistors in load circuits 32 and 34 are coupled to an NPN-level shifting diode-transistor combination 36 which is returned to ground potential at terminal 22. Diode-transistor combination 36 serves to combine differentially related signals produced at load devices 32 and 34 and to couple resultant single-ended signals to a current amplifier 38. Operating current is supplied to a driver transistor 40 of current amplifier 38 by means of a current supply transistor 42, a PNP-diode-transistor combination 44 and a bias network 46. Bias network 46 couples the output (collector) of transistor 40 to a complementary symmetry output stage comprising transistors 48, 50, 52 and 54. Output signals are provided at the joined collector electrodes of transistors 50 and 54 (i.e. at terminal 20 of chip 10).

Current supply transistors 30 and 42 are coupled, in accordance with the present invention, to a source 12 of relatively low-level operating current. Current source 12 comprises first and second transistors 56 and 58 of one conductivity type (NPN) having their base electrodes **56*b* and 58*b* coupled in common at a circuit junction 60 to a means for supplying current which will be explained below. The emitter 58*e* of transistor 58 is directly connected to the reference potential terminal 22 while the emitter 56*e* of transistor 56 is coupled via a current determining resistor 62 to reference terminal 22**.

Transistors 56 and 58 are fabricated in close proximity to each other on integrated circuit chip 10 and have proportionally related conduction characteristics. Transistor 56 has an effective base-emitter junction area four times that of transistor 58. For example, in a typical application the emitter of transistor 58 may be fabricated as a 1 mil by 1 mil square while the emitter of transistor 56 is fabricated as a 1 mil by 4 mil rectangle of like material. The collector **56*e* of transistor 56 also is directly connected to base 56*b* such that transistor 56** provides diodelike operation.

The means for supplying current to circuit junction 60 comprises a starting current transistor 64 having a collector electrode coupled to B+ terminal 18, an open-circuited base electrode and an emitter electrode coupled via a Darlington connected amplifier 66 to circuit junction 60. The collector **58*c* of transistor 58 is connected to the junction of the emitter of starting transistor 64 and an input (base) 66***b* of the Darlington amplifier 66. The effective emitter 66*e* of amplifier 66 is connected to junction 60. The effective collector 66*c* of amplifier 66 is coupled to a means for maintaining the collector currents of transistors 56 and 58 at a substantially fixed ratio (e.g., equal). The last-named means comprises the combination of a diode-connected PNP-transistor 68 and a further PNP-transistor 70, each having their emitter electrodes directly connected to the B+ supply terminal 18. Base electrodes 68*b* and 70*b* are directly connected together and are also directly connected to collector electrode 68*c*. Collector electrode 70*c* is directly connected to collector electrode 58*c* while collector electrode 68*c* is directly coupled via the collector-emitter path 66*c*, 66*e* to collector electrode 56*c*. PNP-transistors 68 and 70 are substantially identical, are located in close proximity to each other on chip 10 and, in operation, function as a unity gain current repeater. Transistors 68 and 70 therefore tend to maintain the collector currents of transistors 56 and 58 substantially equal as will be pointed out below.

The operation of the current source 12 will now be described. Considering the portion of current source 12 which includes transistors 56, 58 and resistor 62, the operation of transistors 56 and 58 may be analyzed by means of the idealized semiconductor junction diode equation $$J=J_s[e^{qV/kT}-1]$$

Where $J$ = current density of a base-emitter diode $J_s$ = saturation current density of the diode $q$ = magnitude of the charge of an electron $k$ = Boltzmann's constant $T$ = absolute temperature in degrees Kelvin $e$ = natural logarithm base $V$ = voltage across the diode junction Expressions of this type may be written for each of the base-emitter diodes of transistors 56 and 58 as follows:

$$J_{be_{58}}=J_{s_{be_{58}}}\left[e^{\frac{qV_{be_{58}}}{kT}}-1\right]$$

$$J_{be_{56}}=J_{s_{be_{56}}}\left[e^{\frac{qV_{be_{56}}}{kT}}-1\right]$$

Rearranging the above expressions relating current density and voltage yields:

$$\frac{J_{be_{56}}}{J_{s_{be_{56}}}}=\left[e^{\frac{qV_{be_{56}}}{kT}}-1\right]$$

$$\frac{J_{be_{58}}}{J_{s_{be_{58}}}}=\left[e^{\frac{qV_{be_{58}}}{kT}}-1\right]$$

Assuming for the moment that means are provided for maintaining the emitter currents of transistors 56 and 58 substantially equal, and the effective base-emitter junction area of transistor 56 is $n$ times that of transistor 58, since the devices 56, 58 are constructed of substantially identical material, the current densities of the two devices will, under those conditions, be related as follows:

$$J_{be_{58}}=NJ_{be_{56}}$$

Because of the similiarity in fabrication, the saturation current densities of the two transistors 56 and 58 are substantially equal, i.e., $$J_{s_{be_{56}}}=J_{s_{be_{58}}}$$

Substituting for $J_{s_{be_{58}}}$ and $J_{be_{58}}$ and taking logarithms yields:

$$lnJ_{be_{56}}-lnJ_{s_{be_{56}}}=(qV_{be_{56}}/kT)$$

$$lnNJ_{be_{56}}-lnJ_{s_{be_{56}}}=(qV_{be_{58}}/kT)$$

(the unity term in the bracket is insignificant for all values of $V_{be}$ of interest and may be disregarded).

The difference between the base-emitter voltages of transistors 58 and 56 may then be calculated by combining the expressions as follows:

$$V_{be_{58}}-V_{be_{56}}=kt/q(lnN+lnJ_{be_{56}}-lnJ_{s_{be_{56}}}-lnJ_{be_{56}}+lnJ_{s_{be_{56}}})=kt/q(lnN)$$

For a typical operating temperature of 300° K., the expression $kt/q$ may be approximated as equal to 26 millivolts.

Therefore where the area ratio $N$ is equal to 4 ($ln4\approx1.38$), the difference in base-emitter voltages of transistors 58 and 56 may be calculated as $$V_{be_{58}}-V_{be_{56}}\approx(26\text{ mv.})(1.38)=\text{mv.}$$

Since the voltage across the base-emitter junction of transistor 58 is equal to the sum of the voltage across resistor 62 plus the voltage across the base-emitter of transistor 56, the difference between the voltages across the base-emitters of transistors 58 and 56 defines the voltage across resistor 62. In accordance with the above expression, the voltage across resistor 62 is therefore substantially equal to 36 millivolts when the area ratio of transistors 56 and 58 is 4 and the collector currents of transistor 56 and 58 are equal. Resistor 62 may be selected to provide a desired current level from transistor 56. For example, for a current of 10 microamperes, resistor 62 is 3,600 ohms (i.e. 36 millivolts/10 microamperes).

The current $I_{out}$ supplied by the above-described arrangement may therefore be selected at any value which satisfies the expression $$I_{out}=(kt/qR_{62})ln(A_{56}/A_{58}$$

where $A_{56}$ and $A_{58}$ are the effective base-emitter areas of transistors 56 and 58 (or their equivalents) and $R_{62}$ is the resistance of resistor 62.

Thus, for a given desired current both the area ratio and the value of resistor 62 may be selected according to the best use of area on chip 10. One can reduce the resistor or increase the area of transistor 56 to increase the current.

It was assumed in the above analysis that the emitter currents of transistors 56 and 58 were maintained substantially equal. The manner in which this current equality is achieved will now be explained.

When operating voltage is initially applied between terminals 13 and 22, starting current transistor 64 which operates as a leakage current device with its base open, couples a relatively small current to the base 66*b* of Darlington amplifier 66. This leakage current is amplified by a factor equal to the product of the current gains of the devices of amplifier 66 (i.e., $\beta_{NPN}^2$) which may be of the order of 1,000. The greatly amplified leakage current is then supplied to the joined base electrodes 56*b*, and 58*b* and, at the same time, the amplified starting current is supplied to the joined base electrodes 68*b*, 70*b*. Since base electrodes 56*b* and 58*b* are connected together and transistor 56 has an effective base-emitter area greater than (e.g. four times) that of transistor 58, the collector current of transistor 56 tends to be approximately four times that of transistor 58 for values of current sufficiently low that the voltage across resistor 62 is much less than the desired operating level. The collector current of transistor 56 is coupled via the collector-emitter path 66*c*, 66*e* to PNP-transistor 68. Transistors 68 and 70 are arranged in a commonly employed current repeater arrangement having approximately unity gain. That is, since the base-emitter junctions of transistors 68 and 70 are connected in parallel, and the devices are substantially identical in operating characteristics, their collector currents are substantially equal. Neglecting the fact that the current supplied at collector 66*c* of Darlington stage 66 must, in addition to the collector current of transistor 68, include the smaller base currents of transistors 68 and 70, the collector current of amplifier 66 also appears at the collector 70*c* of transistor 70. Since the collector current of transistor 58 is, at starting current levels, of the order of one-fourth the collector current of transistor 56, transistor 70 supplies a substantial base current to Darlington stage 66. A regenerative feedback arrangement including amplifier 66 and transistors 68 and 70 is therefore coupled to transistors 56 and 58. As current in transistors 56 and 58 continues to increase, the voltage across resistor 62 becomes significant in comparison to the desired predetermined operating level (e.g., 36 mv. as above). Transistor 56 is therefore supplied with a lower base-emitter voltage than transistor 58 and, as a result, the emitter current in transistor 56 does not continue to increase sufficiently to maintain a 4 to 1 ratio with the emitter current of transistor 58. As the voltage across resistor 62 approaches a level of approximately 36 millivolts ($kT/q \ln A_{56}/A_{58}$), the collector currents of transistors 56 and 58 approach equality. Thereafter, PNP-transistors 68 and 70 tend to maintain substantially equal collector currents in transistors 56 and 58. The feedback system including Darlington amplifier 66, transistors 68 and 70 and transistors 56 and 58 therefore reaches a stable or degenerative condition so that the voltage across resistor 62 (and therefore the current of transistors 56 and 58) tends to remain constant at the predetermined desired level.

Additional transistors such as transistors 30 and 42 may be coupled with their base-emitter junctions in parallel with the base-emitter junction of transistor 58 to provide substantially constant currents determined by the value of resistor 62. Thus, for example, with resistor 62 equal to 3,600 ohms, transistor 30 is fabricated with an effective base-emitter area equal to that of transistor 58 to provide a current of 10 microamperes to differential amplifier 24. Transistor 42 is fabricated with an effective base-emitter area 1.5 times that of transistor 58 to provide a current of 15 microamperes to level translator 44.

It should be noted that the desired current level is established in current source 12 by means which consume only twice the desired current (i.e. equal currents in the circuit paths including the collectors of transistors 56 and 58). Furthermore, the only resistor required is resistor 62 which may be selected at a relatively low value. The difference between the supply voltage provided at terminal 18 and that across resistor 62 is borne principally across the collector-emitter of transistor 70 in one current path and across the collector-emitter of Darlington stage 66 in the other current path of source 12. A relatively wide range of supply voltages may therefore be provided at terminal 18 without affecting the level of current supplied by source 12.

While the invention has been described in terms of a particular embodiment, various modifications may be made within the scope of the invention. For example, a single transistor may be substituted for Darlington amplifier 66. The types of all transistors may be opposite to those illustrated and the polarity of the voltage supplied to terminal 18 would then also be opposite to that shown. Terminal 22 may be coupled to a reference potential other than ground. Furthermore, the function of each of transistors 56, 58, 68 and 70 may be provided by a cascade of a plurality of devices. For example, each of the PNP-devices may be fabricated by direct coupling of an NPN- and a PNP-transistor to provide a composite high $\beta$ PNP as is well known.

The ratio of the effective areas of transistors 56 and 58 may also be selected to be other than 4. However, the ratio must be sufficient, in combination with other circuit parameters, to produce regenerative feedback (gain greater than unity) for the starting condition of the current source 12. The ratio of the areas of PNP-transistors 68 and 70 may also be selected to be other than unity consistent with this requirement.

Starting current transistor 64 may also be eliminated in certain applications where the PNP-devices provide sufficient leakage current, or where there exists sufficient stray capacitance or transients to insure reliable starting.

It should also be noted that resistance may be present between the emitter of transistor 58 and the reference terminal 22 but such resistance is substantially less than that of resistor 62 and, preferably, approaches zero.

What is claimed is:

1. An electrical current source comprising:

a resistor, first and second like conductivity transistor devices having emitter electrodes coupled to opposite ends of said resistor, base electrodes coupled to a common input circuit junction and collector electrodes, the collector electrode of said first device being direct coupled to said junction, and said resistor being included in the collector-emitter current path of said first device, said first device having an effective base-emitter junction area greater than that of said second device, feedback circuit means coupled from the collector of one of said devices to said base electrodes for providing regenerative feedback for collector current levels of said first device less than a predetermined operating current and for providing degenerative feedback when said operating current is reached so as to maintain said predetermined operating current, and means coupled to said junction for providing an output current proportional to said operating level of current.

2. A current source according to claim 1 wherein:

said predetermined operating level is substantially equal to $kt/qR\ln A_{A1}/A_2$ where $k$ is Boltzman's constant, $T$ is the absolute operating temperature, $q$ is the charge of an electron, $R$ is the resistance of said resistor, and $A_1$ and $A_2$ are the effective base-emitter junction areas of said first and second devices, respectively.

3. A current source according to claim 2 wherein:

said feedback means comprises means responsive to collector current in said first device and coupled to said base electrodes for maintaining collector current of said first device substantially at said predetermined current.

4. A current source according to claim 3 wherein:

said feedback means comprises a current repeater coupled to said collectors of said first and second devices for maintaining the collector currents of said devices in predetermined proportional relation when said first device provides said predetermined collector current.

5. A current source according to claim 4 wherein:

said feedback means further comprises a current amplifier having an input coupled to the collector of said second device and an output coupled to said base electrodes.

6. A current source according to claim 5 wherein:

said repeater provides substantially unity current gain such that said feedback means tends to maintain substantially equal collector currents in said first and second devices.

7. A current source according to claim 6 wherein:

said repeater comprises third and fourth transistor devices having their base-emitter circuits coupled in parallel, the collector of one of said third and fourth devices being coupled to the collector of said second device and the bases of said third and fourth devices being coupled to the collector of said first device.

8. A current source according to claim 7 wherein:

said third device further comprises a collector directly coupled to the base of said third device, the collector of said fourth device being connected to the collector of said second device and to said input of said current amplifier.

9. A current source according to claim 8 wherein:

said current amplifier comprises an emitter follower transistor having a base input electrode and having an emitter-collector current path coupled from the base electrodes of said first and second devices to the base electrodes of said third and fourth devices.

10. A current source according to claim 9 and further comprising:

means coupled to the emitters of said third and fourth devices and to the emitter of said second device for coupling operating voltage to said apparatus.

11. A current source according to claim 10 wherein:

said first and second devices are of one type conductivity and said third and fourth devices are of an opposite-type conductivity.

12. A current source according to claim 11 wherein:

said means for providing an output current comprises a fifth transistor device of the same type conductivity as said first and second devices and having a base-emitter circuit coupled in parallel with the like circuit of said second device for providing, at a collector electrode, an output current proportional to said operating current.

13. Apparatus for providing a predetermined current substantially independent of supply voltage comprising:

a resistor, first and second like conductivity transistor devices having proportionally related conduction characteristics, said devices having emitter electrodes coupled to opposite ends of said resistor, base electrodes coupled to a common input circuit junction and collector electrodes, and said resistor is included in the collector-emitter path of said first device, feedback circuit means coupled from the collector electrode of one of said devices to said circuit junction for providing regenerative feedback for collector current levels of said first device less than said predetermined current and for providing degenerative feedback when said predetermined current is reached so as to maintain said collector current substantially constant, means coupled to said feedback means and to said emitter of said second device for coupling operating voltage to said apparatus, and means coupled to said circuit junction for providing output current proportional to said predetermined current.

14. Apparatus according to claim 13 wherein:

said feedback means comprises a current repeater including third and fourth transistor devices of opposite-type conductivity with respect to said first and second devices, the collector electrode of said first device being coupled to the collector and base electrodes of said third device, the collector electrode of said fourth device being coupled to the collector and base electrodes of said second device.

15. Apparatus according to claim 14 wherein:

said feedback means further comprises a current amplifier transistor coupled from the joined collector electrodes of said second and fourth devices to the joined bases of said first and second devices, and said current repeater provides substantially unity current gain.

* * * * *